(12) United States Patent
Toyoyama et al.

(10) Patent No.: US 8,419,248 B2
(45) Date of Patent: Apr. 16, 2013

(54) VEHICLE LIGHT

(75) Inventors: Hideki Toyoyama, Tokyo (JP); Yoshiaki Akiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 395 days.

(21) Appl. No.: 12/785,611

(22) Filed: May 24, 2010

(65) Prior Publication Data

US 2010/0296305 A1 Nov. 25, 2010

(30) Foreign Application Priority Data

May 22, 2009 (JP) ................................. 2009-124535

(51) Int. Cl.
*B60Q 1/04* (2006.01)
*B60Q 1/00* (2006.01)

(52) U.S. Cl.
USPC ........... 362/538; 362/543; 362/544; 362/545; 362/547

(58) Field of Classification Search .................. 362/538, 362/543–545, 547
See application file for complete search history.

(56) References Cited

U.S. PATENT DOCUMENTS

| 7,144,145 | B2* | 12/2006 | Watanabe et al. | 362/544 |
| 7,165,871 | B2* | 1/2007 | Takeda et al. | 362/538 |
| 8,147,109 | B2* | 4/2012 | Wan et al. | 362/547 |
| 2004/0202007 | A1* | 10/2004 | Yagi et al. | 362/545 |
| 2006/0239022 | A1 | 10/2006 | Inaba et al. | |
| 2007/0236953 | A1 | 10/2007 | Nakazawa et al. | |
| 2010/0296306 | A1* | 11/2010 | Toyoyama et al. | 362/519 |

FOREIGN PATENT DOCUMENTS

| JP | 2006-302711 A | 11/2006 |
| JP | 2007-305575 A | 11/2007 |

* cited by examiner

*Primary Examiner* — Stephen F Husar
*Assistant Examiner* — James Cranson, Jr.
(74) *Attorney, Agent, or Firm* — Kenealy Vaidya LLP

(57) ABSTRACT

A vehicle light is provided which can prevent the accumulation of assembly errors during the assembling of separate optical components. The vehicle light can include a first heat sink having a first heat sink body and a first heat radiation fin, and a first optical system configured to form a part of a predetermined light distribution pattern. The first optical system can include a first LED light source, a first reflector configured to reflect light emitted from the first LED light source, and a projection lens configured to allow light reflected from the first reflector to pass therethrough. The first LED light source, the first reflector, and the projection lens can be secured to an upper surface of the first heat sink body.

15 Claims, 5 Drawing Sheets

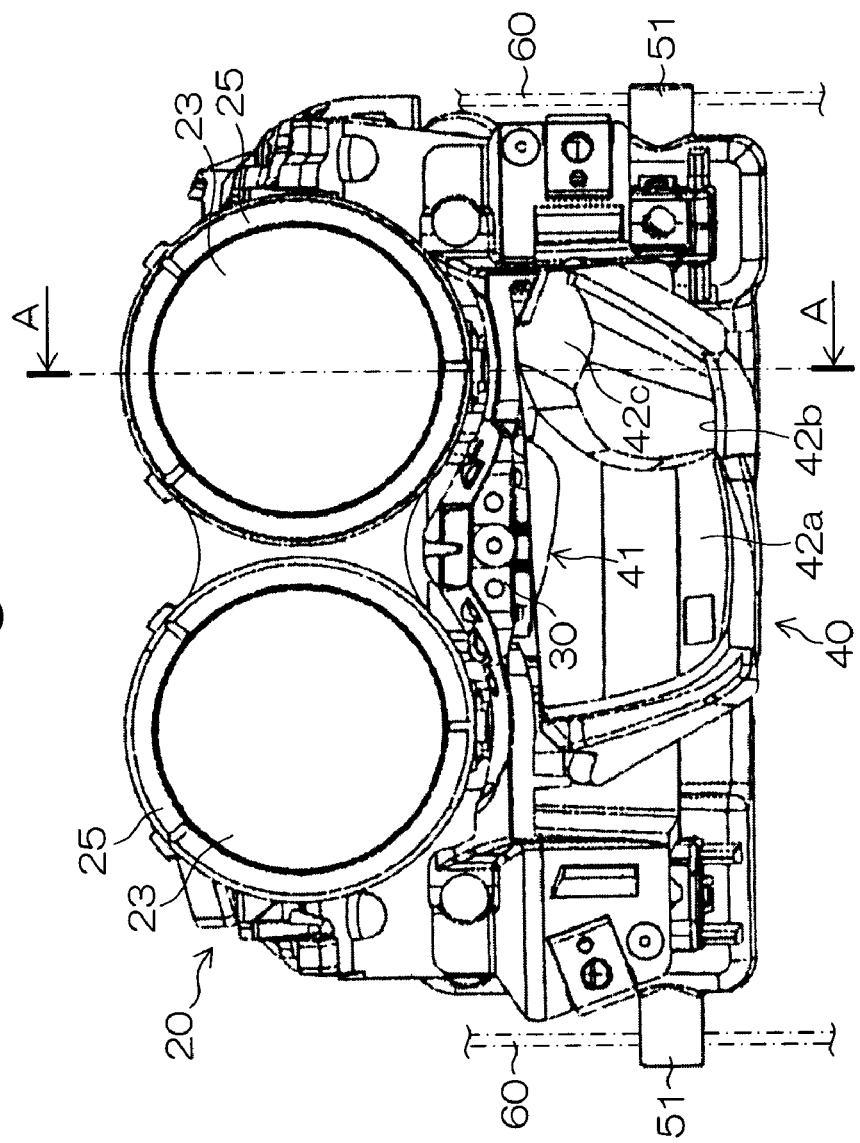

VEHICLE LIGHT

This application claims the priority benefit under 35 U.S.C. §119 of Japanese Patent Application No. 2009-124535 filed on May 22, 2009, which is hereby incorporated in its entirety by reference.

This application is related to Applicant's co-pending U.S. patent application Ser. No. 12/785,585, filed on the same date herewith, May 24, 2010, and which disclosure is hereby incorporated in its entirety by reference.

TECHNICAL FIELD

The presently disclosed subject matter relates to a vehicle light, and in particular, to a vehicle light including an optical system composed of separate optical components.

BACKGROUND ART

A conventional known vehicle light 200 can include an upper optical system 210, and a lower optical system 220 disposed below the upper optical system 210. The illumination light from both the upper and lower optical systems 210 and 220 can form a predetermined light distribution pattern (for example, one disclosed on Japanese Patent Application Laid-Open No. 2006-302711). Each of the optical systems can be composed of optical components such as a projection lens 211, a reflecting surface 212 (221), and a light source 213 (222).

SUMMARY

However, in the vehicle light 200, the respective optical components constituting the upper optical system 210 and the lower optical system 220 are attached to different members as shown in FIG. 1. As a result, the respective optical components have assembly errors associated with their assembly that can accumulate, thereby adversely affecting the optical performances of the respective optical systems 210 and 220.

Furthermore, as they are separately assembled, when the vehicle light is installed in a vehicle body, it is difficult to adjust the optical axis because of these assembly errors.

Accordingly, it is desired to develop an installation mechanism for installing a vehicle light into a vehicle body that may not be affected by these component assembly errors.

The presently disclosed subject matter was devised in view of these and other features and problems and in association with the conventional art. According to an aspect of the presently disclosed subject matter, a vehicle light can prevent the accumulation of assembly errors during the assembling of separate optical components.

According to another aspect of the presently disclosed subject matter, a vehicle light can include a first heat sink having a first heat sink body and a first heat radiation fin, and a first optical system configured to form a part of a predetermined light distribution pattern. The first optical system can include a first light source, a first reflector configured to reflect light emitted from the first light source, and a projection lens configured to allow light reflected from the first reflector to pass therethrough. The first light source, the first reflector and the projection lens can be secured to an upper surface of the first heat sink body.

In the vehicle light according to the above aspect of the presently disclosed subject matter, the first light source, the first reflector and the projection lens, which are the optical components for constituting the first optical system, can be secured to the same surface of the same member (i.e., the upper surface of the first heat sink body). This configuration can prevent the accumulation of assembly errors during assembly of these optical components.

The vehicle light with the above mentioned configuration can further include a second heat sink having a second heat sink body fixed to a front surface of the first heat sink body and a second heat radiation fin, and a second optical system configured to form a part of the predetermined light distribution pattern. The second optical system can include a second light source and a second reflector configured to reflect light emitted from the second light source. The second light source and the second reflector can be secured to a lower surface of the second heat sink body.

In the vehicle light, the second light source and the second reflector, which can comprise the optical components for constituting the second optical system, can be secured to the same surface of the same member (i.e., the lower surface of the second heat sink body). This configuration can prevent the accumulation of assembly errors during assembly of these optical components.

When the above-described vehicle light is installed in a vehicle body, the first optical system can be positioned on an upper side of the vehicle light, and the second optical system can be positioned on a lower side while adjacent to the first optical system.

In the above-described vehicle light, the light source can be an LED light source.

The above-described vehicle light can further include a stay having swinging axes provided at respective ends of the stay, the swinging axes serving as a swinging center during the adjustment of an optical axis of the vehicle light, and a fixing mechanism configured to fix the stay on or near a center of gravity of the vehicle light.

In the above-described vehicle light, the predetermined light distribution pattern may be any one of a low beam light distribution pattern, a high bean light distribution pattern, and a light distribution pattern for a fog light.

BRIEF DESCRIPTION OF DRAWINGS

These and other characteristics, features, and advantages of the presently disclosed subject matter will become clear from the following description with reference to the accompanying drawings, wherein:

FIG. 5 is a front view of the vehicle light of FIG. 2.

DESCRIPTION OF EXEMPLARY EMBODIMENTS

A description will now be made below to an example of a vehicle light with reference to the accompanying drawings and in accordance with an exemplary embodiment of the presently disclosed subject matter.

Figure 1:
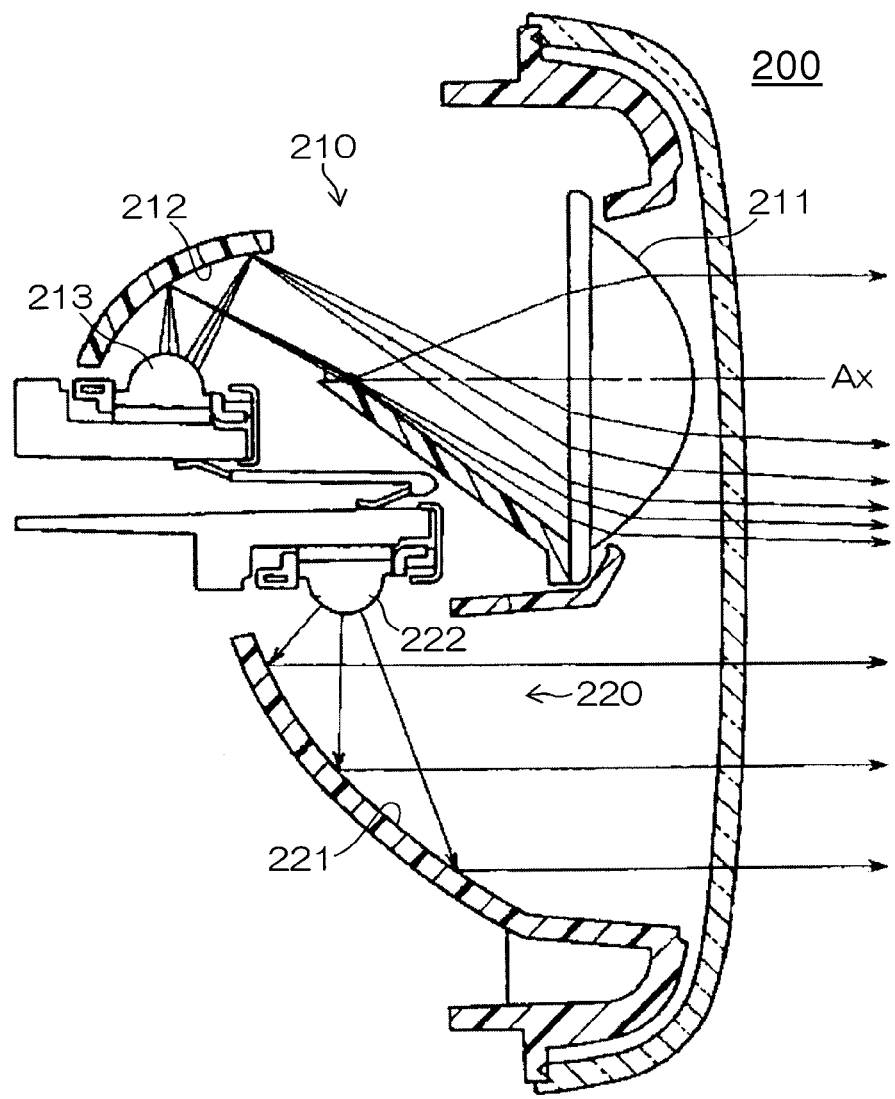
FIG. 1 is a cross-sectional view of a conventional vehicle light.
Figure 2:
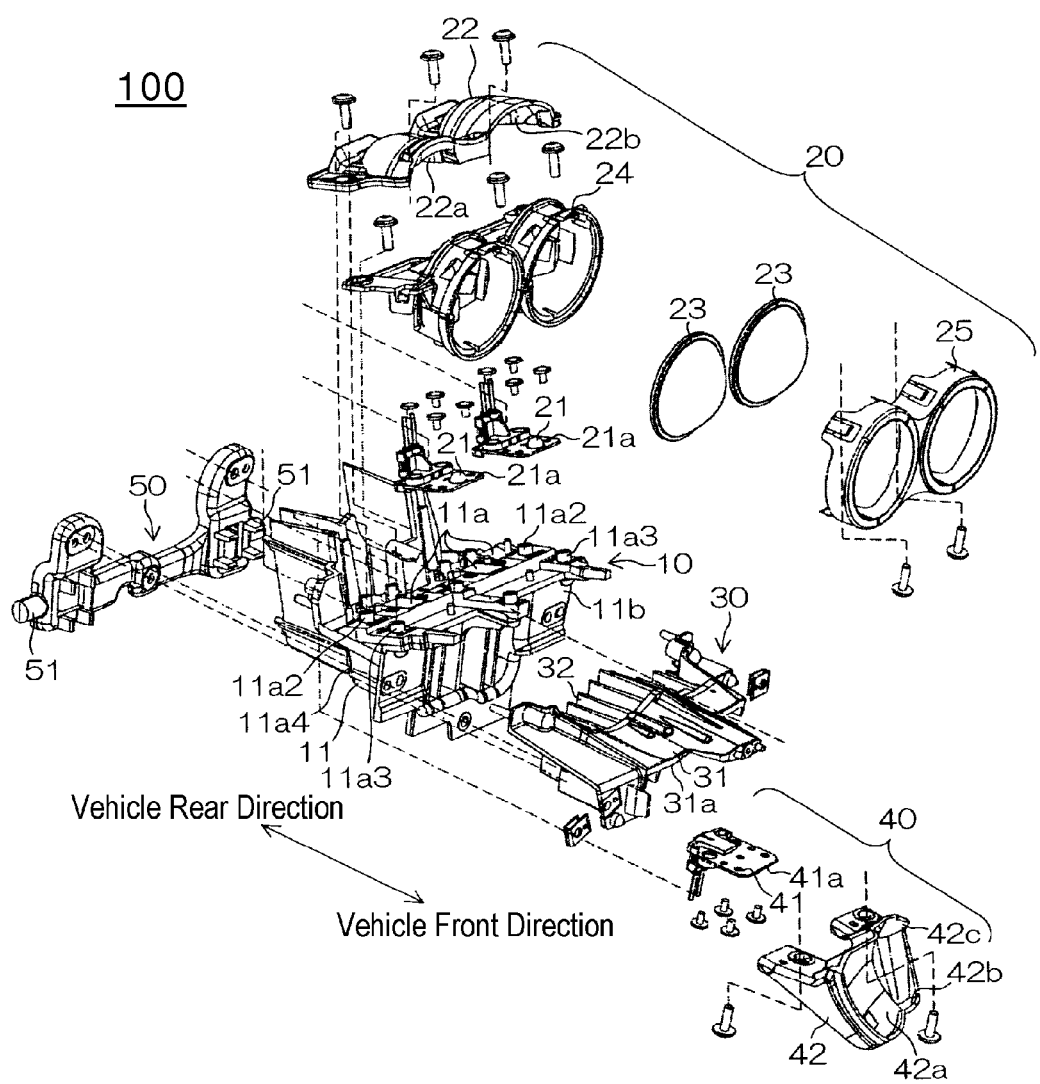
FIG. 2 is a diagram illustrating a vehicle light made in accordance with principles of the presently disclosed subject matter.

The vehicle light 100 of the present exemplary embodiment can be applied to a vehicle headlight, a fog light or the like for an automobile or vehicle. As shown in FIG. 2, the vehicle light 100 can include a first heat sink 10, an upper optical system 20 (or first optical system), a second heat sink 30, a lower optical system 40 (or second optical system), and a stay 50, for example.

The first heat sink 10 can include a first heat sink body 11 disposed on the front side of a vehicle body, and a first heat radiation fin 12 disposed on the rear side of the vehicle body.

Figure 3:
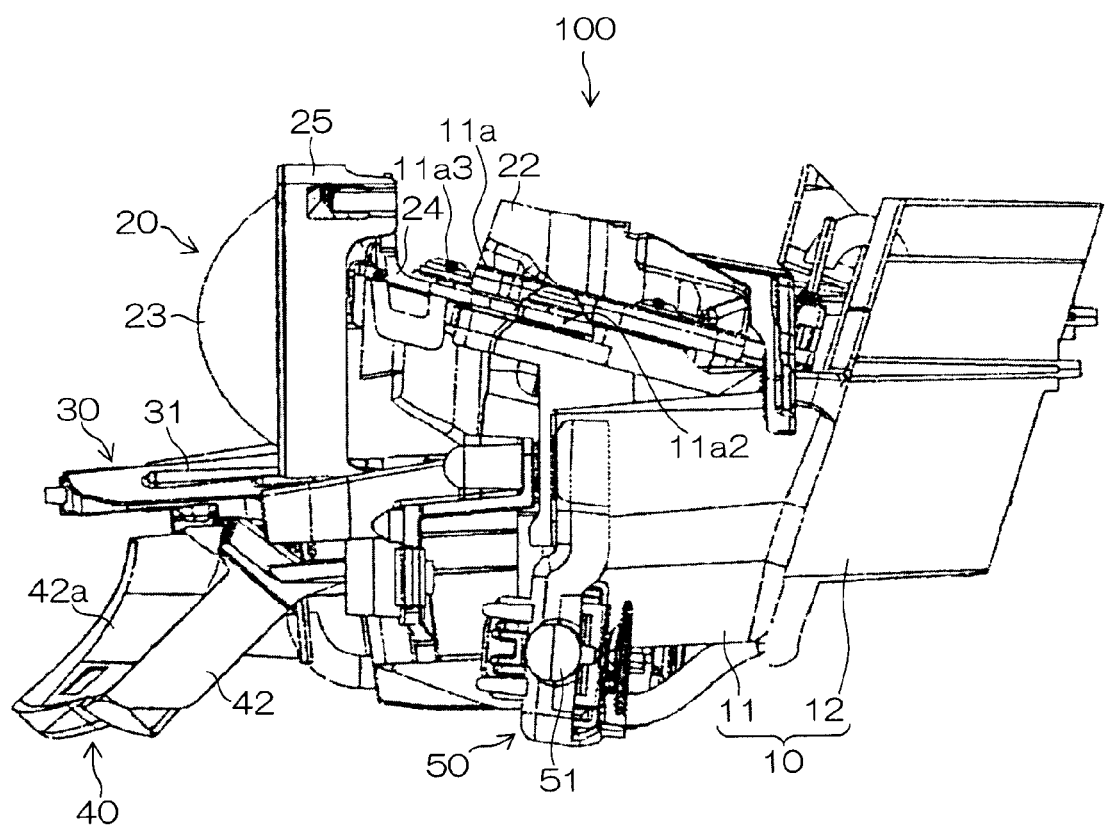
FIG. 3 is a side view of the vehicle light of FIG. 2.
Figure 4:
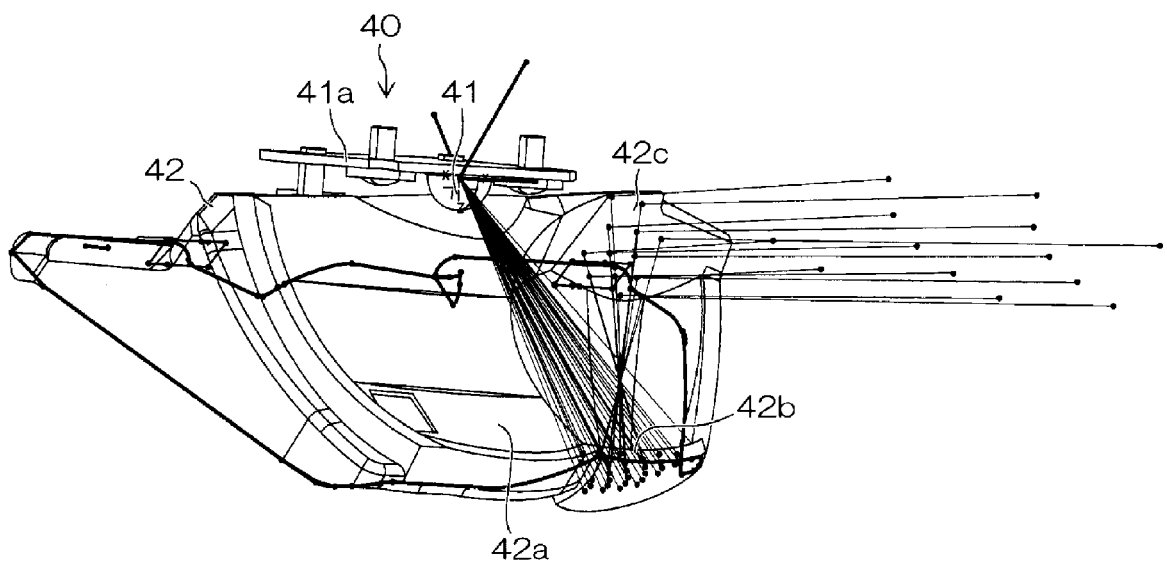
FIG. 4 is a perspective view of a lower optical system.

The upper optical system 20 can be a projection optical system configured to form a part of a desired light distribution pattern. As shown in FIGS. 2 and 3, the upper optical system 20 can be composed of a plurality of optical assemblies. The optical assemblies can be fixed to respective locations on the upper surface 11a of the first heat sink 10, which is inclined downward from the front side of a vehicle body to the rear side, so that the optical assemblies do not interfere with each other. In the exemplary embodiment shown in FIGS. 2 to 5, two optical assemblies are arranged in the vehicle width direction. Each optical assembly can be composed of various optical components such as a first light source 21, a first reflector 22, a projection lens 23, a lens holder 24, a retainer 25, and the like. It should be noted that the desired light distribution pattern should satisfy the conditions of specifications required for a vehicle light, and examples thereof include a so-called low beam light distribution pattern, a high beam light distribution pattern, a light distribution pattern for a fog light (for fog weather, bad weather, and the like).

The first light source 21 can be an LED light source, for example, including a single LED chip or a plurality of LED chips that are packaged. The first light source 21 can be disposed at a predetermined rear-side position on the upper surface 11a of the first heat sink 10 and fixed by screwing so that the illumination direction of the first light source 21 is directed upward and slightly backward with respect to the vehicle body.

The first reflector 22 can be composed of reflecting surfaces 22a and 22b as shown in FIG. 2. The first reflector 22 can be positioned at a predetermined position 11a2 on the upper surface 11a of the first heat sink 10 and fixed by screws or other attachment structures, systems or materials so that the reflecting surfaces 22a and 22b are disposed in the illumination direction of the corresponding first LED light sources 21.

The reflecting surfaces 22a and 22b can receive the light emitted from the respective first light sources 21 and reflect the same to the corresponding projection lenses 23 so that the light passing through the projection lenses 23 can form a part of a desired light distribution pattern. The reflecting surfaces 22a and 22b can be changed according to a required vehicle specification, and examples thereof include an elliptic reflecting surface, a parabolic reflecting surface, and the like. In the present exemplary embodiment, the reflecting surfaces 22a and 22b can be formed as an elliptic reflecting surface.

The projection lens 23 can be held between the lens holder 24 and the retainer 25. The lens holder 24 can be positioned at a predetermined front position 11a3 on the upper surface 11a of the first heat sink 10 and fixed by screws or the like.

As shown in FIGS. 2 and 3, the second heat sink 30 can include a second heat sink body 31 disposed on the front side of the vehicle body, and a second heat radiation fin 32 disposed on the rear side of the vehicle body. The second heat sink 30 can be fixed to the front face 11b of the first heat sink 10 by screws or the like.

The lower optical system 40 can form a part of the desired light distribution pattern. The lower optical system 40 can be composed of a plurality of optical assemblies. The optical assemblies can be fixed to respective locations on the lower surface 31a of the second heat sink body 31 so that the optical assemblies do not interfere with each other. Each optical assembly can be composed of various optical components such as a second light source 41 and a second reflector 42, and the like.

The second light source 41 can be an LED light source, for example, including a single LED chip or a plurality of LED chips that are packaged. The second light source 41 can be disposed at a predetermined position on the lower surface 31a of the second heat sink 30 and fixed by screws or the like so that the illumination direction of the second LED light source 41 is directed downward and slightly frontward with respect to the vehicle body.

The second reflector 42 can be composed of a first reflecting surface 42a, a second reflecting surface 42b, and a third reflecting surface 42c as shown in FIG. 2 to FIG. 5. The second reflector 42 can be formed by, for example, injecting a resin material to form a reflector base, and subjecting the reflector base to mirror treatment (aluminum deposition or the like), so that the reflecting surfaces can be integrally and simultaneously formed. The second reflector 42 can be positioned at a predetermined position on the lower surface 31a of the second heat sink body 31 and fixed by screws or the like so that the first reflecting surfaces 42 and the second reflecting surface 42b are disposed in the illumination direction of the second LED light source 41.

The first reflecting surface 42a can be configured to reflect light that is emitted from the second light source 41 and that reaches the first reflecting surface 42a to a predefined illumination direction so as to form a part of the desired light distribution pattern. The first reflecting surface 42a can be formed by a parabolic reflecting surface, an elliptic reflecting surface, or the like in accordance with the vehicle light specifications. In the present exemplary embodiment, the first reflecting surface 42a is formed as a parabolic reflecting surface.

The second reflecting surface 42b can be disposed in the light emitting direction of the second light source 41 and out of the illuminated area of the first reflecting surface 42a by the second light source 41. In the present exemplary embodiment, the second reflecting surface 42b is formed to extend from the lower end of the first reflecting surface 42a (see FIGS. 4 and 5). Furthermore, the second reflecting surface 42b can be configured to reflect light that is emitted from the second light source 41 and that reaches the second reflecting surface 42b to the third reflecting surface 42c. In the present exemplary embodiment, the second reflecting surface 42b is formed as an elliptic reflecting surface. The elliptic second reflecting surface 42b can have a first focal point on or near the second light source 41 and a second focal point disposed between the second reflecting surface 42b and the third reflecting surface 42c.

The third reflecting surface 42c can be disposed at a certain position so that the light-emitting areas of the upper optical system 20 and the lower optical system 40 can be observed as an integrated single light-emitting area of the optical systems. In the present exemplary embodiment, the third reflecting surface 42c is disposed near the boundary between the upper optical system 20 and the lower optical system 40. The third reflecting surface 42c can reflect light from the second reflecting surface 42b to a predefined illuminating direction. In the present exemplary embodiment, the third reflecting surface 42c is a parabolic reflecting surface, and disposed sideward from the second light source 41 and near the upper end of the first reflecting surface 42a.

As shown in FIGS. 2 and 3, the stay 50 can be fixed on or near a center of gravity of the vehicle light 100 by screws or the like so as to be detachable. In the present exemplary embodiment, the stay 50 is disposed below the first heat sink body 11. The stay 50 (or stay body) can have swinging axes 51 provided at respective ends of the stay 50. The swinging axes 51 can serve as a swinging center during optical axis adjustment. The swinging axes 51 can be clamped between extensions 60 provided on a vehicle body as shown in FIG. 5, whereby the vehicle light 100 with the above-described configuration can be supported while being swingable around the swinging axes in the front and rear directions. This configuration can be used for optical axis adjustment of the vehicle light 100. Namely, this configuration can be used for simultaneous optical axis adjustment of the vehicle light 100 that is formed by assembling a plurality of optical systems with the originally designed accuracy (specification).

According to the present exemplary embodiment, the respective optical components (including the first light source 21, the first reflector 22, and the projection lens 23) constituting the upper optical system 20 (corresponding to the first optical system) can be secured to the same surface of the same member (i.e., the upper surface 11a of the first heat sink body 11). Accordingly, this configuration can prevent the accumulation of assembly errors during the assembling of these optical components (including the first light source 21, the first reflector 22, and the projection lens 23).

In addition, the respective optical components (including the second light source 41 and the second reflector 42) constituting the lower optical system 40 (corresponding to the second optical system) can be secured to the same surface of the same member (i.e., the lower surface 31a of the second heat sink body 31). Accordingly, this configuration can prevent the accumulation of assembly errors during the assembling of these optical components (including the second light source 41 and the second reflector 42).

Furthermore, according to the present exemplary embodiment, the first reflecting surface 42a, the second reflecting surface 42b, and the third reflecting surface 42c can be integrally formed into the very same reflector, or the second reflector 42. Accordingly, there is no need to separately assemble three reflecting surfaces with high accuracy. Instead, the first reflecting surface 42a second reflecting surface 42b and third reflecting surface 42c can be integrally and simultaneously formed into a single reflector with the originally designed accuracy. Furthermore, the first reflecting surface 42a, the second reflecting surface 42b, and the third reflecting surface 42c can be assembled in a period of time that is shorter than the time required to make similar reflecting surfaces in the conventional vehicle light. In addition to this, the accumulation of assembly errors during the assembling of the first reflecting surface 42a the second reflecting surface 42b and the third reflecting surface 42c can be prevented.

Furthermore, according to the present exemplary embodiment, the stay 50 can be positioned on or near (substantially at) a center of gravity of the vehicle light 100. Accordingly, when the optical axis of the vehicle light 100 is adjusted by swinging the vehicle light 100 by means of a known optical axis adjuster (not shown), the load applied to the adjuster can be relieved. Furthermore, when the vehicle light 100 is vibrated due to travel of the vehicle, adverse effects of vibration to the vehicle light 100 can be suppressed.

In the present exemplary embodiment, the stay 50 can be fixed so as to be freely attached to and detached from the vehicle light 100. However, in certain cases the vehicle light 100 can include another component added to the first heat sink 10 or other structure, or a certain component can be removed from the vehicle light 100. In this case, the position of the center of gravity may be changed. Even in this case, simply by changing the design of stay 50, the relationship between the position of center of gravity and the stay 50 (or the swinging axes 51) can be adjusted to the relationship according to the originally designed specification.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
    a first heat sink having a first heat sink body having an upper surface, and a first heat radiation fin;
    a first optical system configured to form a part of a predetermined light distribution pattern, the first optical system including a first light source, a first reflector configured to reflect light emitted from the first light source, and a projection lens configured to allow light reflected from the first reflector to pass therethrough;
    a stay having swinging axes provided at respective ends of the stay, the swinging axes serving as a swinging center during adjustment of an optical axis of the vehicle light; and
    a fixing mechanism configured to fix the stay substantially at a center of gravity of the vehicle light, wherein
    the first light source, the first reflector and the projection lens are secured to the upper surface of the first heat sink body.

2. The vehicle light according to claim 1, further comprising:
    a second heat sink having a second heat sink body fixed to a front surface of the first heat sink body wherein the second heat sink body has a lower surface, and the second heat sink has a second heat radiation fin; and
    a second optical system configured to form a part of the predetermined light distribution pattern, the second optical system including a second light source and a second reflector configured to reflect light emitted from the second light source, wherein the second light source and the second reflector are secured to the lower surface of the second heat sink body.

3. The vehicle light according to claim 2, wherein the first optical system is positioned on an upper side of the vehicle light, and the second optical system is positioned on a lower side of the vehicle light while also adjacent to the first optical system.

4. The vehicle light according to claim 3, wherein the light source is an LED light source.

5. The vehicle light according to claim 4, wherein the predetermined light distribution pattern is any one of a low beam light distribution pattern, a high beam light distribution pattern, and a light distribution pattern for a fog light.

6. The vehicle light according to claim 3, wherein the predetermined light distribution pattern is any one of a low beam light distribution pattern, a high beam light distribution pattern, and a light distribution pattern for a fog light.

7. The vehicle light according to claim 2, wherein the light source is an LED light source.

8. The vehicle light according to claim 7, wherein the predetermined light distribution pattern is any one of a low beam light distribution pattern, a high beam light distribution pattern, and a light distribution pattern for a fog light.

9. The vehicle light according to claim 2, wherein the predetermined light distribution pattern is any one of a low beam light distribution pattern, a high beam light distribution pattern, and a light distribution pattern for a fog light.

10. The vehicle light according to claim 1, wherein the predetermined light distribution pattern is any one of a low beam light distribution pattern, a high beam light distribution pattern, and a light distribution pattern for a fog light.

11. The vehicle light according to claim 1, wherein the predetermined light distribution pattern is any one of a low beam light distribution pattern, a high beam light distribution pattern, and a light distribution pattern for a fog light.

12. The vehicle light according to claim 2, wherein the predetermined light distribution pattern is any one of a low beam light distribution pattern, a high beam light distribution pattern, and a light distribution pattern for a fog light.

13. The vehicle light according to claim 3, wherein the predetermined light distribution pattern is any one of a low beam light distribution pattern, a high beam light distribution pattern, and a light distribution pattern for a fog light.

14. The vehicle light according to claim 7, wherein the predetermined light distribution pattern is any one of a low beam light distribution pattern, a high beam light distribution pattern, and a light distribution pattern for a fog light.

15. The vehicle light according to claim 4, wherein the predetermined light distribution pattern is any one of a low beam light distribution pattern, a high beam light distribution pattern, and a light distribution pattern for a fog light.

* * * * *